UNITED STATES PATENT OFFICE.

EDWIN R. BART, OF CINCINNATI, OHIO.

IMPROVEMENT IN THE MANUFACTURE OF INDIA-RUBBER ARTICLES.

Specification forming part of Letters Patent No. 148,164, dated March 3, 1874; application filed September 18, 1873.

*To all whom it may concern:*

Be it known that I, EDWIN R. BART, of Cincinnati, Hamilton county, Ohio, have invented a new and useful Manufacture of India-Rubber Articles, of which the following is a specification:

My invention has for its principal object the utilization of old car-springs and other bulky pieces of waste rubber, by cutting the same up into specific forms, such as anti-friction and anti-rattling pads, bumpers, cushions, and stoppers of various descriptions, &c. The invention is, however, also available for the manufacture of india-rubber articles in the first instance, or of new rubber.

The instrument or machine preferably employed by me for this purpose is an endless or band saw, such as is used for the manufacture of wooden scroll or ornamental work, the rapid movement in one direction wholly and the thinness of such saw rendering it well adapted for my purpose. I may, however, use for this purpose a simple wire or band of steel or brass, with or without a sharpened edge, and with or without a lubricating or an abrading agent. The stuff, having been secured in a clamp or rest, may be guided by compulsory rotation about a center, or in a certain definite path, by means of a guiding-surface, or pattern or pivot.

A high velocity of the saw is of vital necessity, and is claimed as an element of useful novelty in my invention.

During use for this purpose, the surface of the saw or other instrument may be kept wet with oil, soap-suds, water, or other lubricant, or be supplied with any suitable abradant such as emery, plumbago, rouge, soap-stone, either in the dry or moistened condition.

The waste rubber or blanks, having been reduced to the condition of rectangular blocks, may be marked by means of a stencil for the desired shape or figure, or by paper pattern pasted to each block, or otherwise. Flat articles may, by my process, be rapidly and economically produced by cutting a number at one time out of a pack of sheets or blanks suitably clamped for that purpose. I may use for this purpose a triangular or square wire, which may be twisted so as to present a spiral cutting form or surface, or a screw-finished wire of any kind. After all available articles have been thus cut out of the block, the fragments and sawdust will have been rendered more valuable by the subdivision, because already partially comminuted for the process of reworking, to which old and refuse rubber must, under the customary methods, be subjected before it is available for remanufacturing into articles of utility.

I claim as new and of my invention—

The method herein described of manufacturing articles of irregular form from soft vulcanized rubber by cutting the same by the agency of a rapidly-moving band-saw or mechanically equivalent means.

In testimony of which invention I hereunto set my hand.

EDWIN R. BART.

Attest:
 GEO. H. KNIGHT,
 S. B. SPEAR.